(12) United States Patent
Kütt

(10) Patent No.: US 8,170,185 B2
(45) Date of Patent: May 1, 2012

(54) AUTHENTICATION SYSTEM AND METHOD

(75) Inventor: Andres Kütt, Tallinn (EE)

(73) Assignee: Skype Limited, Dublin (IE)

( * ) Notice: Subject to any disclaimer, the term of this patent is extended or adjusted under 35 U.S.C. 154(b) by 1165 days.

(21) Appl. No.: 12/005,155

(22) Filed: Dec. 21, 2007

(65) Prior Publication Data

US 2009/0122968 A1 May 14, 2009

(30) Foreign Application Priority Data

Nov. 14, 2007 (GB) .................................... 0722370.4

(51) Int. Cl.
*H04M 11/00* (2006.01)
(52) U.S. Cl. ............. 379/93.02; 379/93.03; 379/142.05; 379/188; 370/352; 370/353; 370/354; 370/355; 370/356; 726/4; 726/5; 726/6; 726/7; 726/8
(58) Field of Classification Search ............... 379/93.02, 379/93.03, 142.05, 188; 370/352, 353, 354, 370/355, 356; 726/4, 5, 6, 7, 8
See application file for complete search history.

(56) References Cited

U.S. PATENT DOCUMENTS

| | | | |
|---|---|---|---|
| 2004/0267942 A1 | 12/2004 | Maes | |
| 2006/0168015 A1* | 7/2006 | Fowler | ......................... 709/206 |
| 2007/0237154 A1 | 10/2007 | Kalinichenko et al. | |

FOREIGN PATENT DOCUMENTS

| | | |
|---|---|---|
| EP | 1 558 004 A1 | 7/2005 |
| WO | WO 2005/009019 A2 | 1/2005 |

OTHER PUBLICATIONS

International Search Report, PCT/EP2008/053719, date of mailing Oct. 2, 2008.

* cited by examiner

*Primary Examiner* — Xu Mei
*Assistant Examiner* — Paul Kim
(74) *Attorney, Agent, or Firm* — Hamilton, Brook, Smith & Reynolds, P.C.

(57) ABSTRACT

A method of authorising a user of a first packet-based communication network to access a second packet-based communication network. The method comprises: receiving an authorization request from a user terminal of the user at a first network element of the first packet-based communication network, the authorization request comprising a first user identity; responsive to the authorization request, transmitting a request to create a second user identity from the first network element to a second network element of the second packet-based communication network; the second network element creating the second user identity for use in the second packet-based communication network, the second user identity being derivable from the first user identity according to a predetermined rule; and storing the second user identity in the second packet-based communication network for use with subsequent communication events over the second packet-based communication network.

38 Claims, 5 Drawing Sheets

AUTHENTICATION SYSTEM AND METHOD

RELATED APPLICATION

This application claims priority under 35 U.S.C. §119 or 365 to Great Britain, Application No. 0722370.4, filed Nov. 14, 2007. The entire teachings of the above application are incorporated herein by reference.

TECHNICAL FIELD

This invention relates to an authentication system and method, particularly but not exclusively for use in packet-based communication systems.

BACKGROUND

The Internet is used to provide a variety of different forms of communication between users. Two popular forms of communication are instant messaging ("IM") and voice communication using voice over internet protocol ("VoIP").

Instant messaging is a computer-based communication tool in which text-based messages are exchanged between users in real-time. To use an instant messaging system, user terminals of the users must be connected to a communications network, such as the internet, and an instant messaging client application must be executed on the user terminal. The client application allows a user to initiate an instant messaging conversation with a remote user, by establishing a connection over the communications network. The user can then type a message and send it to the remote user (by pressing "enter" or actuating a "send" button), and the message is displayed in the user interface of the client of the remote user in near real-time (depending on network delays). The remote user may then subsequently type a reply and send it to the other user. The exchange of messages can continue in this way, in a similar form to face-to-face verbal conversation.

Voice over internet protocol ("VoIP") communication systems allow the user of a device, such as a personal computer, to make calls across a computer network such as the Internet. These systems are beneficial to the user as they are often of significantly lower cost than fixed line or mobile networks. This may particularly be the case for long distance calls. To use VoIP, the user must install and execute client software on their device. The client software provides the VoIP connections as well as other functions such as registration and authentication. VoIP systems can also be enhanced through the provision of video calling.

One type of VoIP communication system uses a peer-to-peer ("P2P") topology built on proprietary protocols. To enable access to a peer-to-peer system, the user must execute P2P client software provided by a P2P software provider on their computer, and register with the P2P system. When the user registers with the P2P system the client software is provided with a digital certificate from a server. Once the client software has been provided with the certificate, communication can subsequently be set up and routed between users of the P2P system without the further use of a server. In particular, the users can establish their own communication routes through the P2P system based on the exchange of one or more digital certificates (or user identity certificates, "UIC"), which enable access to the P2P system. The exchange of the digital certificates between users provides proof of the user's identities and that they are suitably authorised and authenticated in the P2P system. Therefore, the presentation of digital certificates provides trust in the identity of the user. It is therefore a characteristic of peer-to-peer communication that the communication is not routed using a server but directly from end-user to end-user. Further details on such a P2P system are disclosed in WO 2005/009019.

SUMMARY

A problem with existing Internet-based communication tools is that different software providers frequently offer independent, incompatible products. For example, a first software provider may offer an IM client, which becomes very popular and a large number of users communicate with each other using this IM client. Similarly, a second software provider may offer a popular VoIP client. To gain the benefit of both these services, a user must download and execute both clients separately. However, the user must now maintain separate contact lists for each of the clients. Therefore, if a user has a contact in the IM client but not the VoIP client, then the user is unable to call this contact.

There is therefore a need for a technique to address the aforementioned problems with separate internet-based communication tools in order to provide integration and interoperability.

According to one aspect of the present invention there is provided a method of authorising a user of a first packet-based communication network to access a second packet-based communication network, comprising: receiving an authorisation request from a user terminal of the user at a first network element of the first packet-based communication network, the authorisation request comprising a first user identity; responsive to the authorisation request, transmitting a request to create a second user identity from the first network element to a second network element of the second packet-based communication network; the second network element creating the second user identity for use in the second packet-based communication network, the second user identity being derivable from the first user identity according to a predetermined rule; and storing the second user identity in the second packet-based communication network for use with subsequent communication events over the second packet-based communication network.

In one embodiment, the predetermined rule comprises combining the first network identity and a predefined token. In another embodiment, the predetermined rule comprises concatenating the first network identity with at least one predefined control character. In another embodiment, the predetermined rule is a hash function.

Preferably, the first packet-based communication network is an instant messaging network. Preferably, the second packet-based communication network is a voice over internet protocol network. Preferably, the voice over internet protocol network is a peer-to-peer network.

In one embodiment, the communication event is a voice call. In another embodiment, the communication event is a video call.

Preferably, the method further comprises the step of a calling user terminal initiating a communication event with the user over the second packet-based communication network. Preferably, the step of the calling user terminal initiating the communication event with the user comprises the calling user terminal deriving the second user identity from the first user identity using the predetermined rule, and using the second network identity to establish a connection with the user over the second network.

Preferably, the method further comprises the step of the user terminal initiating a communication event with a further user over the second packet-based communication network. Preferably, the method further comprises the step of the user terminal storing a list of contacts of the user, the list of contacts comprising network identities of the contacts in the first network.

Preferably, the step of initiating the communication event with the further user comprises selecting the further user from the list of contacts, deriving a network identity of the further user in the second network from the network identity in the first network stored in the list of contacts using the predetermined rule, and using the network identity of the further user in the second network to establish a connection with the further user over the second network.

Preferably, the authorisation request received at the first network element further comprises a password.

Preferably, the method further comprises the step of the user terminal deriving the second user identity from the first network using the predetermined rule and transmitting an authorisation request to the second communication network comprising the second user identity.

Preferably, the method further comprises the steps of the user terminal transmitting a request for a digital certificate to the first network element, the first network element requesting the digital certificate from the second network element, the second network element providing the digital certificate to the first network element, and the first network element providing the digital certificate to the user terminal. Preferably, a private key is derived from the digital certificate, and wherein the authorisation request transmitted to the second communication network comprises the private key. Preferably, the digital certificate is provided to the second packet-based communication network prior to initiating a communication event.

According to another aspect of the present invention there is provided a system comprising a first network element connected to a first packet-based communication network and a second network element connected to a second packet-based communication network, wherein the first network element is arranged to receive an authorisation request comprising a first user identity from a user terminal and transmit a request to create a second user identity to the second network element responsive to the authorisation request, and the second network element is arranged to create the second user identity for use in the second packet-based communication network, the second user identity being derivable from the first user identity according to a predetermined rule, and store the second user identity for use with subsequent communication events over the second packet-based communication network.

According to another aspect of the present invention there is provided a network element connected to a packet-based communication network, comprising: means for receiving a request to create a user identity from a further network entity connected to a further packet-based communication network, the request comprising a further user identity used in the further packet-based communication network; means for creating the user identity for use in the packet-based communication network, the user identity being derivable from the further user identity according to a predetermined rule; and means for storing the user identity in the packet-based communication network for use with subsequent communication events over the packet-based communication network.

According to another aspect of the present invention there is provided a method of authorising a user of a first packet-based communication network to access a second packet-based communication network, comprising: receiving at a network entity connected to the second packet-based communication network a request to create a user identity, the request being transmitted from a first network entity connected to the first packet-based communication network and comprising a first user identity used in the first packet-based communication network; the network entity creating the user identity for use in the second packet-based communication network, the user identity being derivable from the first user identity according to a predetermined rule; and the network entity storing the user identity in the second packet-based communication network for use with subsequent communication events over the second packet-based communication network.

According to another aspect of the present invention there is provided a computer program product comprising program code means which when executed by a computer implement the steps according to the above-described method.

BRIEF DESCRIPTION OF THE DRAWINGS

For a better understanding of the present invention and to show how the same may be put into effect, reference will now be made, by way of example, to the following drawings in which.

DETAILED DESCRIPTION

Figure 1:
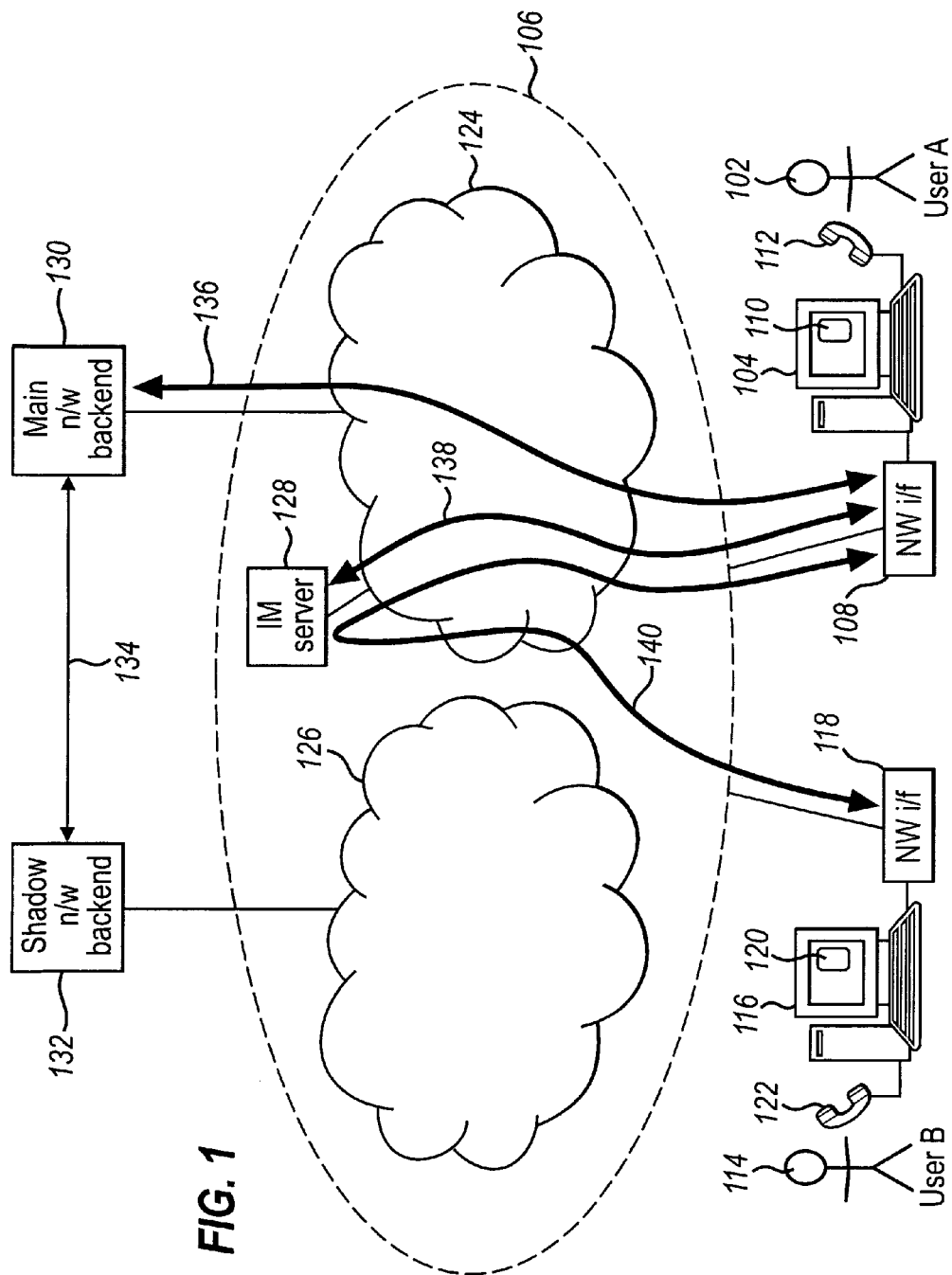
FIG. 1 shows a system comprising a main communication network and a shadow communication network.

Reference is first made to FIG. 1, which illustrates a system comprising two separate communication networks with a combined, interoperable authentication scheme.

A first user of the system (denoted "User A" 102) operates a user terminal 104, which is shown connected to a network 106, such as the Internet. The user terminal 104 may be, for example, a personal computer ("PC"), personal digital assistant ("PDA"), a mobile phone, a gaming device or other embedded device able to connect to the network 106. The user terminal 104 has a display such as a screen and a keyboard and mouse. The user terminal 104 is connected to the network 106 via a network interface 108 such as a modem, and the connection between the user terminal 104 and the network interface 108 may be via a cable (wired) connection or a wireless connection.

The user terminal 104 is running a client 110. The client 110 is a software program executed on a local processor in the user terminal 104. The user terminal 104 is also connected to a handset 112, which comprises a speaker and microphone to enable the user to listen and speak in a voice call. The microphone and speaker does not necessarily have to be in the form of a traditional, telephone handset, but can be in the form of a headphone or earphone with an integrated microphone, or as a separate loudspeaker and microphone independently connected to the user terminal 104.

Also connected to network 106 is at least one other user of the system. For example, FIG. 1 illustrates User B 114 operating a user terminal 116 and connected to the network 106 via a network interface 118. User terminal 116 executes client software 120 comprising similar functionality to client 110 executed on the user terminal 104 of User A 102, and is connected to handset 122. Note that, in practice, there may be a very large number of users connected to the system, but these are not illustrated in FIG. 1 for clarity.

Within the Internet 106 are illustrated an instant messaging network 124 and a VoIP network 126. Both of these networks use the Internet 106 as their communication infrastructure, but they are conceptually separate. In this example embodiment, the IM network 124 is referred to as the "main" network, and the VoIP network 126 is referred to as the "shadow" network. Note that in this example, the VoIP network is a P2P VoIP network. However, in other embodiments, non-P2P VoIP networks could also be used. The use of an IM network and a VoIP network is merely an example, and other types of communication network can be made interoperable by this scheme.

Connected to the IM (main) network 124 is an IM server 128, which provides the connections between users in IM conversations. In alternative embodiments, the IM network 124 can use a non-centralised IM system, such as a peer-to-peer system, in which case the IM server 128 is not required. Also connected to the IM network 124 is a main network backend server 130.

Connected to the VoIP (shadow) network 126 is a shadow network backend server 132. The main network backend server 130 is connected to the shadow network backend server 132, and these servers can communicate with each other using a server-to-server application programming interface ("API") 134.

FIG. 1 also illustrates how User A 102 and User B 114 can communicate using IM. For example, User A 102, using the client 110, logs into the IM network 124 by providing authentication information to the main network backend server 130. Preferably, the authentication information is in the form of a username and password. This is illustrated by the arrow 136 in FIG. 1. If User A 102 is successfully authenticated, then User A 102 can use the IM system to communicate with other users. For Example, if User B 114 is also logged into the IM network 124 (through a similar authentication process, not shown) then User A can initiate an IM chat with User B. This can be achieved by User A 102 selecting User B 114 from a contact list displayed in the client 110.

In the example shown in FIG. 1, the IM network 124 uses a centralised IM server 128 to establish the connections between the users. The client 110 of User A 102 communicates with the IM server 128 to determine the network address of the client 120 of User B 114 (arrow 138). Once the network address of User B's client is known, then a connection is set up between User A 102 and User B 114 (as shown with arrow 140) via the IM server 128. User A can type a message using terminal 104, and this is transmitted to the terminal 116 of User B 114, where it can be read. Similarly, User B 114 can reply to the message, and this reply is transmitted to User A's terminal 104.

Note that in some embodiments, the functionality of the IM server 128 and the main network backend server 130 may be integrated into a single network element.

In the example shown in FIG. 1, the main network 124 is only able to offer a single communication type—instant messaging. There may be a desire on the part of the providers of the IM network to extend the functionality of their system to offer further communication types, such as VoIP. This would then allow the users to initiate voice conversations with each other, using the same single contact list that is used for the IM conversations. However, the implementation of a reliable, high quality, VoIP client is very complex, and would require substantial development of the existing client. These problems can be overcome by cooperation with an existing VoIP software provider, as described below.

An existing, separate VoIP network can be used to provide the voice communications to extend the functionality of the main network. Because the use of the separate network for voice calls is predominantly hidden from the users, the VoIP network is known as the shadow network. The client software used to access the IM network is modified in order to allow it to access the shadow network and make voice calls, and this can be achieved relatively easily as the software provider for the shadow network already has the software required to do this for use in their own, standalone client.

Figure 2:
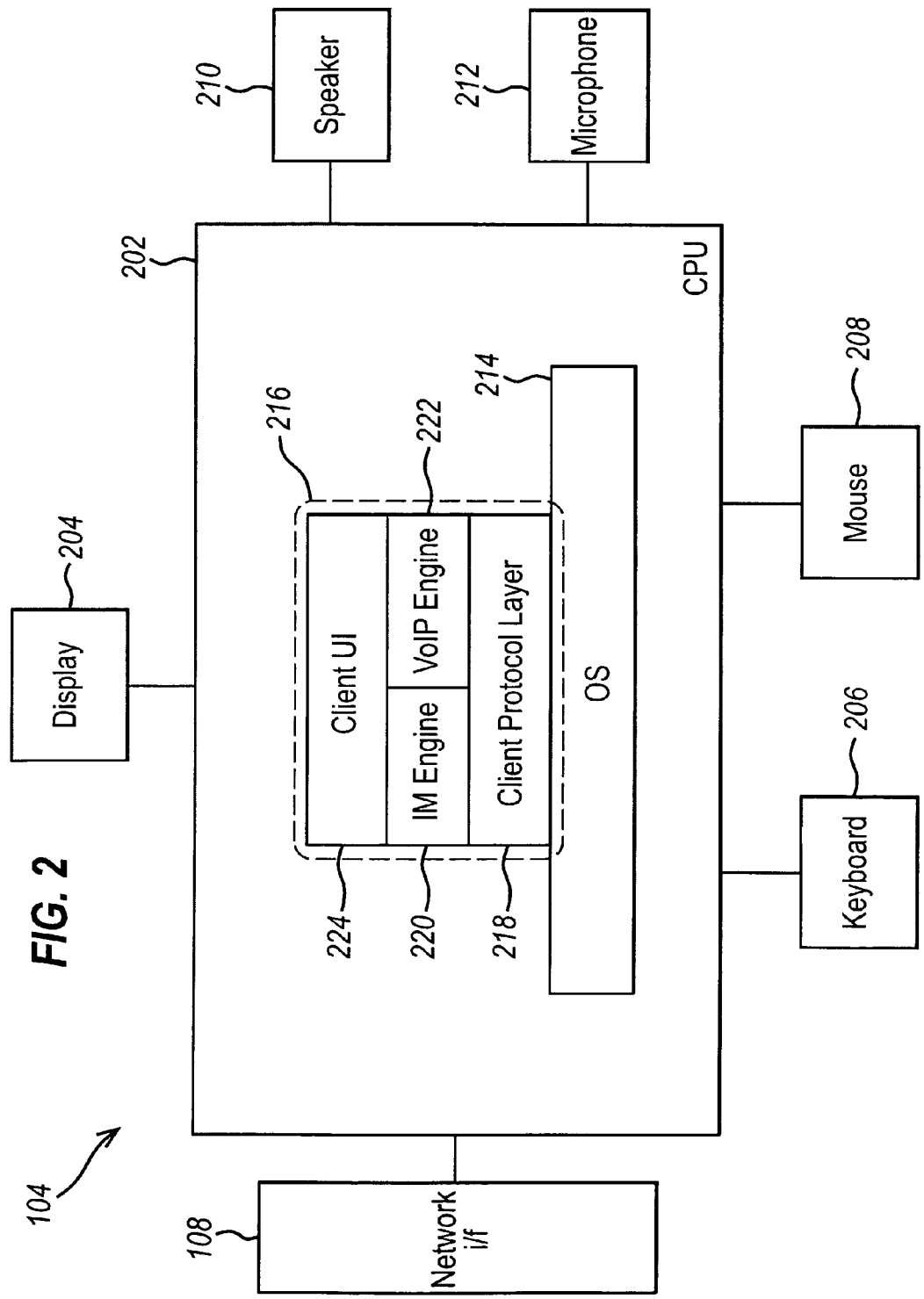
FIG. 2 shows the structure of a user terminal executing client software.

FIG. 2 illustrates a detailed view of the user terminal (104) on which is executed client 110, which has been modified to allow voice calls to be made over the shadow network. The user terminal 104 comprises a central processing unit ("CPU") 202, to which is connected a display 204 such as a screen, an input device such as a keyboard 206, a pointing device such as a mouse 208, a speaker 210 and a microphone 212. The speaker 210 and microphone 212 may be integrated into a handset 112 or headset, or may be separate. The CPU 202 is connected to a network interface 108 as shown in FIG. 1.

FIG. 2 also illustrates an operating system ("OS") 214 executed on the CPU 202. Running on top of the OS 214 is a software stack 216 for the client 110. The software stack shows a protocol layer 218, an IM engine layer 220, a VoIP engine layer 222 and a client user interface layer ("UI") 224. Each layer is responsible for specific functions. Because each layer usually communicates with two other layers, they are regarded as being arranged in a stack as shown in FIG. 2. The operating system 214 manages the hardware resources of the computer and handles data being transmitted to and from client and the network via the network interface 108. The client protocol layer 222 of the client software communicates with the operating system 214 and manages the communication connections over the Internet.

The IM engine layer 220 comprises the functionality needed to send and receive IM messages over the main network 124, for example as described with reference to FIG. 1. The VoIP engine layer 222 comprises the functionality required to make and receive VoIP voice calls over the shadow network. Typically, the VoIP engine layer 222 is provided to the operator of the IM network by the software provider of the shadow network.

Above the IM engine layer 220 and the VoIP engine layer 222 is a client user interface layer 218. The client user interface layer 218 presents information to the user via a single user interface, regardless of whether the main network (via the IM engine) or shadow network (via the VoIP engine) is being utilised. In particular, a single list of contact is provided to the user, and communication with these contacts may be established using either the main or shadow networks.

Therefore, the client structure shown in FIG. 2 provides the user with the capability to connect to either the IM (main) network 124 for instant messaging communication or to the VoIP (shadow) network 126 for voice calls. However, as the shadow network is an entirely separate network to the main network, and not under the control of the provider of the client software, the users of the main network is not registered with the shadow network. Therefore, the shadow network has no knowledge of the users of the main network. The users of the main network are therefore unable to log into the shadow network.

It is undesirable for the user to have to separately register with the shadow network, and thereby provide another username and password in addition to the one used for the IM network. Furthermore, it is also undesirable to prompt the user to log in (i.e. enter a username and password) twice—once for the main network and once for the shadow network.

Figure 3:
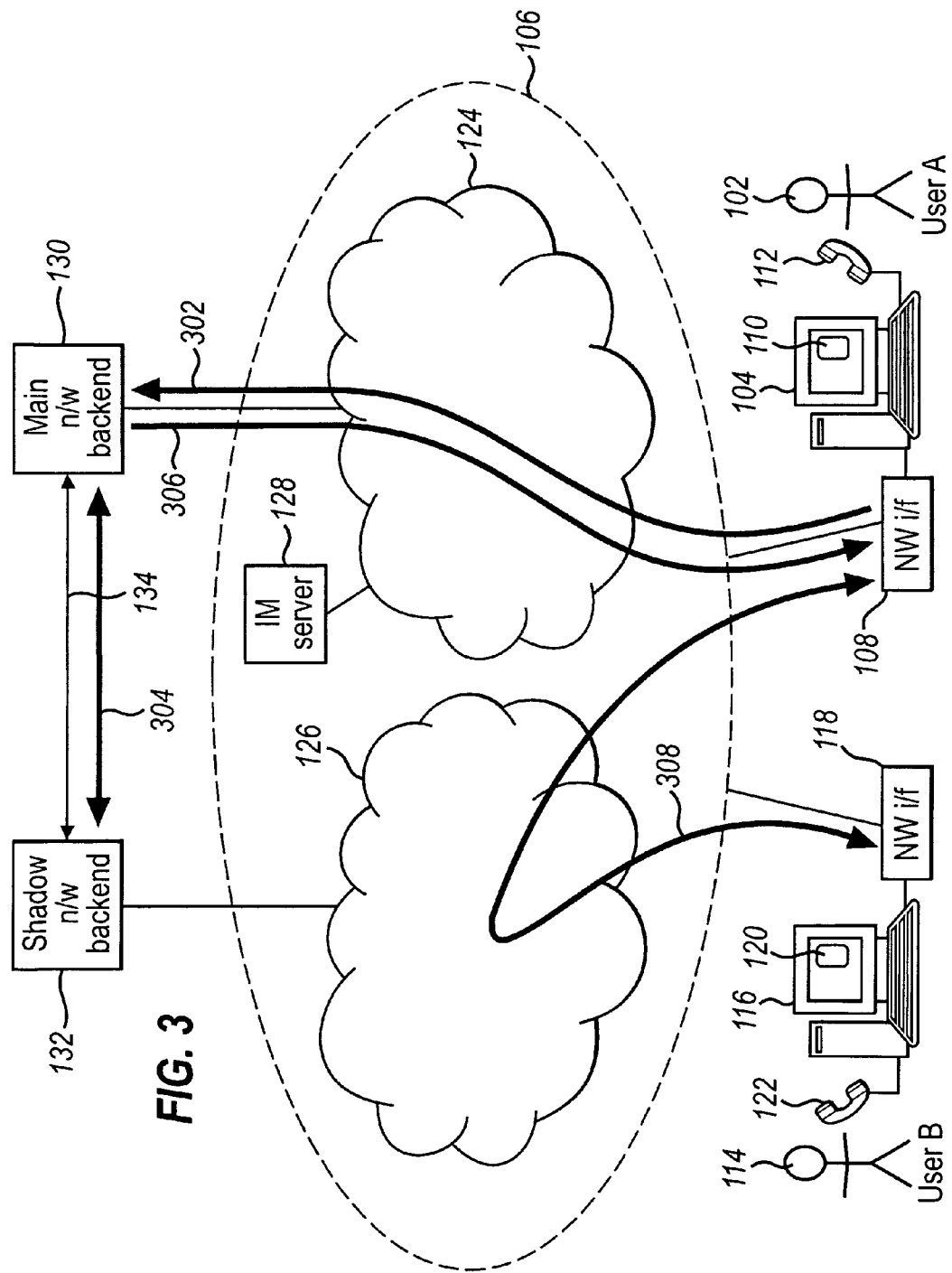
FIG. 3 shows a system comprising a main communication network and a shadow communication network with the automatic registration of a user on the shadow network.
Figure 4:
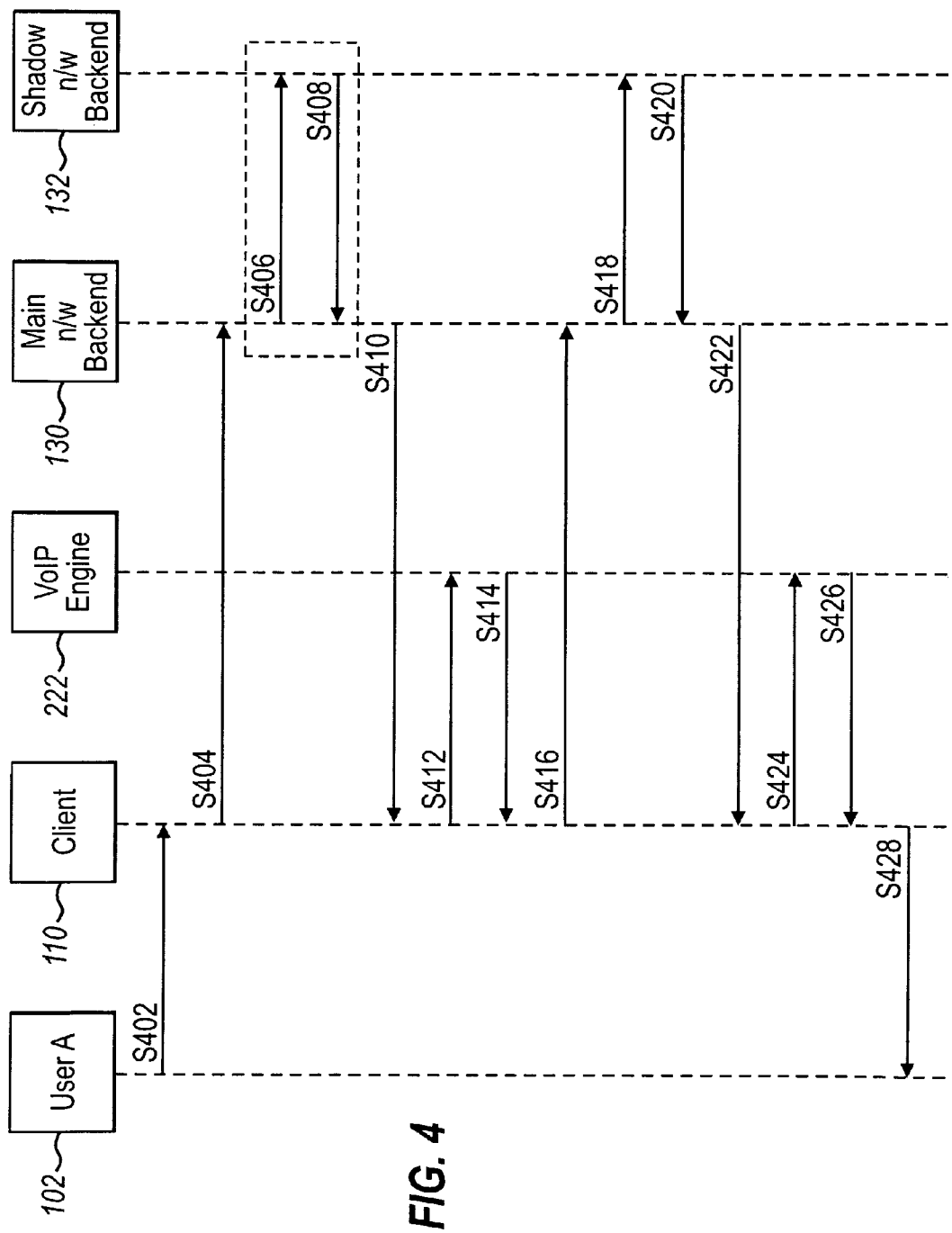
FIG. 4 shows a process for registering a user on the shadow network.

The process shown in FIG. 3 and FIG. 4 illustrates a combined authentication scheme which enables a user of the main network to be automatically registered on the shadow network, such that the user is able to log into the main and shadow networks with a single username and password.

The process shown in FIGS. 3 and 4 is performed the first time the user logs into the main network using the modified client (comprising the VoIP engine) as shown in FIG. 2. Referring first to FIG. 4, in step S402, User A 102 enters his username and password for the main network into the client user interface displayed on his user terminal 104. In step S404, the username and password are transmitted to the main network backend server 130 within an authentication request message. This is illustrated as arrow 302 in FIG. 3.

The main network backend server 130 processes the authentication request in order to validate the username and password. If the username and password are valid, the main network backend server 130 determines whether this user has been registered on the shadow network 126. As this is the first time User A 102 has used the modified client 110, User A 102 has not been registered with the shadow network. Responsive to determining that User A 102 has not been registered with the shadow network, the main network backend server 130 transmits a "create user" request message to the shadow network backend server 132 in step S406 in FIG. 4 (shown as arrow 304 in FIG. 3). The "create user" request message comprises the username of User A in the main network.

Responsive to "create user" request message to the shadow network backend server 132 creates an account for User A on the shadow network. To do this, a username for User A must be created in the shadow network. The preferred username to use would be the same as that used in the main network, as this already needs to be entered into the client by the user when logging into the main network. However, as the shadow network is a pre-existing network with a pre-existing user-base, it cannot be guaranteed that this username is unique, and has not already been taken by another user. Therefore, a new username is created by the shadow network backend server 132 which is known to be unique, but can be readily derived from the main network username.

In order to create the shadow username, a sequence of characters is pre-pended to the main network username. The sequence of characters contains at least one particular character or combination of characters which other users of the shadow network cannot use in usernames. For example, if the username in the main network is "usera123", then the shadow network username can be created as "xyz:usera123". The sequence "xyz:" contains a colon character, which cannot be used by normal users of the shadow network. The letters "xyz" identify the operator of the main network. Therefore, the shadow network can be sure that no pre-existing users of the shadow network have a username starting "xyz:" and because the username usera123 is known to be unique in the main network, the combination "xyz:usera123" is also known to be unique in the shadow network.

In alternative embodiments, different methods could be used for deriving the shadow username from the main network username. For example, the sequence of characters could be appended to the username, or inserted in a particular position within the username. The sequence of characters could also be as short as a single control character, or longer. As a further alternative, a hash function can be used to derive the shadow username.

Once the shadow username has been created by the shadow network backend server 132 it is stored for subsequent use on the shadow network, and an acknowledgement is returned to the main network backend in step S408 of FIG. 4. An acknowledgement confirming successful log-in is sent from the main network backend server 130 to the client in step S410 (arrow 306 in FIG. 3). Note that the process of registering the shadow username on the shadow network is hidden from the user—the user only needs to enter the username and password for the main network, and the registration on the shadow network is performed automatically.

Note that if User A 102 has previously logged into the main network with the modified client, then a shadow username has already been created for User A, and steps S406 and S408 are skipped.

Following the acknowledgement of a successful log-in, the client 110 automatically attempts to log into the VoIP shadow network. The log-in process to the VoIP network is handled by the VoIP engine 222 within the client 110, as illustrated in FIG. 2. In step S412 of FIG. 4, the client 110 sends a request to the VoIP engine 222 to log-in to the VoIP network.

If this is the first time that the client has logged into the VoIP network then steps S414 to S424 need to be performed in order to obtain a digital certificate to gain access to the VoIP network. Note that the use of digital certificates is required particularly for P2P VoIP networks. Other types of non-P2P VoIP network can also be used that do not require digital certificates, in which case these steps are replaced with a request for other user credentials, such as a password.

In step S414, the VoIP engine 222 sends a message to the client 110 indicating that a digital certificate is required, and the client 110 forwards this message to the main network backend server 130 in step S416. The main network backend server 130 requests the digital certificate from the shadow network backend server 132 over the server-to-server API 134 in step S418. The digital certificate is provided to the main network backend server in step S420, passed onto the client 110 in step S422, and provided to the VoIP engine 222 in step S424. The digital certificate is requested and provided via the main network because the shadow network trusts the main network to have authenticated the user to a sufficient extent. In other words, the shadow network trusts the main network to have ensured that the user is entitled to be issued with the digital certificate.

Once the VoIP engine 222 has been provided with the digital certificate, it is able to log into the VoIP network. In particular, the VoIP engine 222 derives the user's shadow username, as it is aware of the method used to create the shadow username from the main username. The shadow username and a private key corresponding to the digital certificate are used to log into the shadow network. Note that for the example of a P2P VoIP network, communication with a central server is not required. When the VoIP engine 222 has successfully logged into the VoIP network then a confirmation message is sent to the client 110 in step S426, and User A is notified in step S428.

Once the process outlined in FIG. 4 is complete, then User A 102 is connected to, and is online on, both the main and shadow networks. Therefore, User A 102 can make and receive IM messages over the main network 124, and make and receive VoIP calls over the shadow network.

For example, if User B 114 is also connected to the shadow network then User A 102 can call User B 114 using VoIP. To call User B 114, User A 102 selects the contact for User B displayed in the contact list of the client 110. In order for the call to be established over the VoIP network, the client 110 must know the username of User B 114. The username of User B in the main network is known to User A 102, as User B 114 is listed in User A's contact list. The client 110 also knows the method by which the username in the shadow network is derived. For example, if the client has the main network username of "userb987" stored for User B 114, then the client pre-pends the sequence "xyz:" to this username to form the shadow username for User B 114 of "xyz:userb987". The client 110 can these use the shadow username to establish a call with the client 120 of User B 114, as illustrated by arrow 308 in FIG. 3.

Therefore, the client 110 is able to construct the shadow username for any of the contacts for which the main network username is also known. Similarly, another user of the system (such as User B 114) can construct the shadow username of User A 102, and place a call to User A 102 using this shadow username.

The above-described system and method therefore enables a shadow network to be combined with a main network to supplement the services offered by the main network. The user of the main network does not need to be aware of the shadow network being present, and is not required to take any action in order to utilise the services of the shadow network. The registration and authentication process is performed automatically. The user also does not need to change any aspect of his contact list in order to use the shadow network to communicate with his contacts, as the usernames of the contacts registered with the shadow network are derivable from the username of the main network.

An issue that can arise from the use of separate main and shadow networks is a disparity in the levels of security between the two networks. For example if the main network is an IM network, then it does not offer any paid-services, for which the users have to pay money. The levels of security in this network can therefore be quite low, as there is no financial information. On the other hand, a VoIP network—which can be the shadow network—might offer paid services. For example, the users may need to pay for calls made to the public switched telephone network ("PSTN"), or to receive calls from the PSTN.

As the levels of security in the main network may be quite low, it could be possible for a malicious third party to obtain the username and password of the user in the main network. This would therefore enable them to log into both the main and shadow networks, as described above. This can be a problem as it would allow the malicious third party to gain access to the user's account in the shadow network, which, as mentioned above, can involve paid-services.

To avoid the security issue, the user is prompted to set up a separate username and password to access their account information in the shadow network. The process for achieving this is described below with reference to FIG. 5. The account information for the user is viewed in an internet browser 502 executed on the user terminal of the user, and the account information itself is held on a server called a webstore 504 connected to the VoIP network 126.

Figure 5:
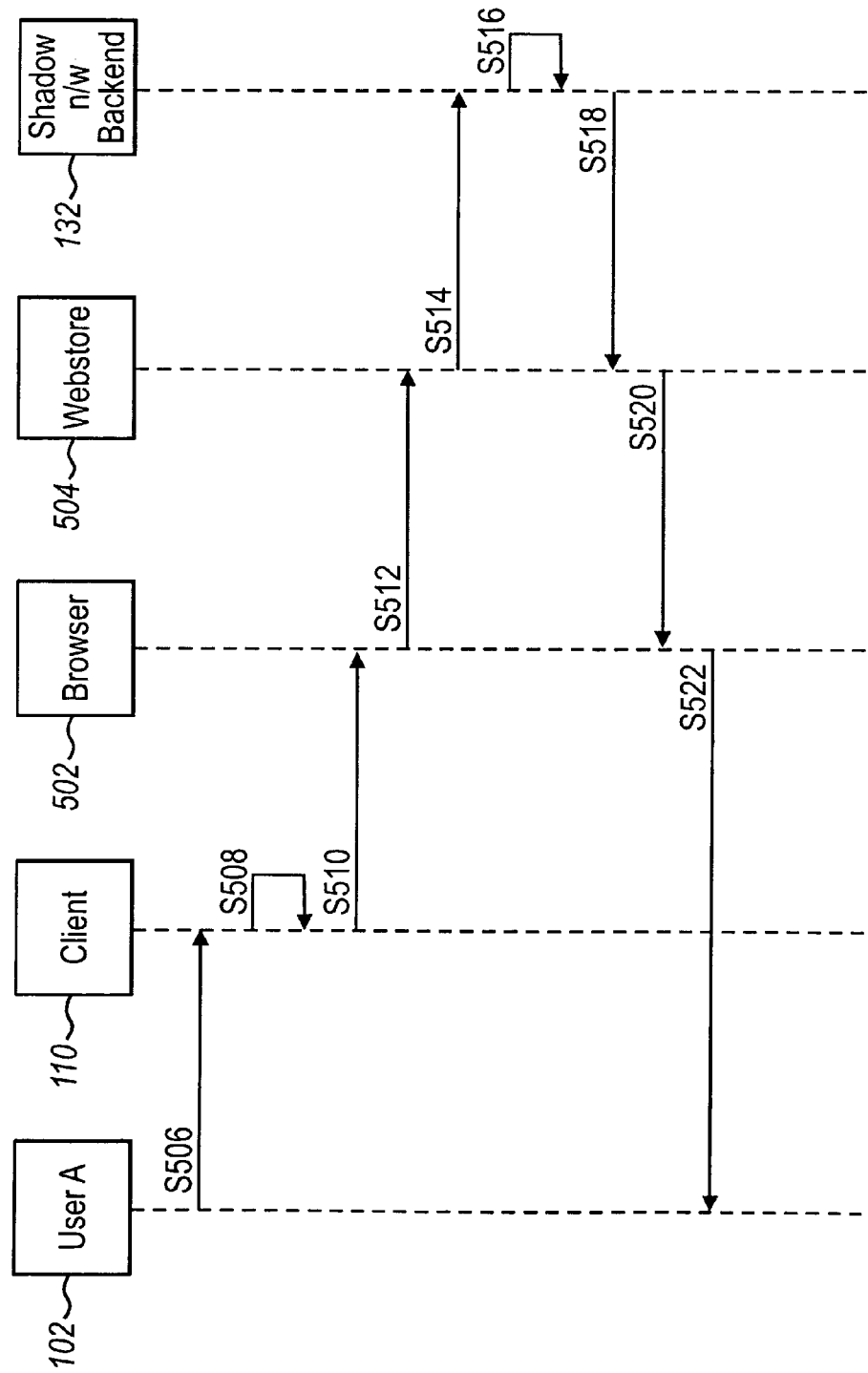
FIG. 5 shows a process for setting up a secure username and password for accessing shadow network account information.

The process described in FIG. 5 is performed the first time that the user accesses his account using the modified client. In step S506, User A 102 requests to view his account information from the webstore 504, by selecting on option displayed in the client 110. In step S508, the client generates a unique data sequence. The unique data sequence is used to verify the user for this initial session accessing the webstore 504. Preferably, the data sequence comprises at least some of the following information: the digital certificate, the shadow username, the current time, the name of the main network, and a random number. The client 110 also generates a digital signature from this information for inclusion in the data sequence.

In step S510, the client 110 passes the data sequence and the uniform resource locator ("URL") of the webstore 504 to the web browser 502. In step S512, the web browser navigates to the URL of the webstore 504, and passes the webstore 504 the data sequence. In step S514, the webstore 504 forwards the data sequence to the shadow network backend 132 for verification in step S516.

The verification of the data sequence comprises the shadow network backend 132 verifying the digital signature, validating the digital certificate and shadow username of the user, and checking that an identical data sequence has never been used before. The shadow network backend 132 also stores the data sequence so that it may be compared with future data sequences received, to prevent it being re-used. A further verification performed includes checking that the time stored in the data sequence is within a predetermined range of the current time—i.e. that the data sequence is not too old.

If all of the above verifications are successful, then an "ok" message is sent to the webstore 504 in step S518. In response to this, the webstore 504 returns a webpage to the web browser in step S520. The webpage is displayed to User A 102 in step S522, and comprises fields for the user to set up a username and password that can be used to access the webstore 504. Once the user has selected a username and password, the information in the webstore 504 can be displayed to the user. The webstore 504 stores the username and password selected, and all subsequent access to the webstore 504 require this username and password to be entered.

While this invention has been particularly shown and described with reference to preferred embodiments, it will be understood to those skilled in the art that various changes in form and detail may be made without departing from the scope of the invention as defined by the appendant claims. For example, instead of the main network being an IM network, and the shadow network being a VoIP network, the opposite scenario could apply. Similarly, a network providing video calls could be used as either the main or shadow network. Furthermore, two similar but separate networks can be made interoperable using the above-described technique. For example, two separate IM networks, each with different sets of users, can interoperate using this technique to allow the sets of users to communicate with each other. In fact, the above-described scheme can be used to supplement any packet-based communication network through the addition of a suitable complimentary shadow network, linked by the use of automatically created shadow accounts.

What is claimed is:

1. A method of authorising a user of a first packet-based communication network to access a second packet-based communication network, comprising:

receiving an authorisation request from a user terminal of the user at a first network element of the first packet-based communication network, the authorisation request comprising a first user identity;

responsive to the authorisation request, transmitting a request to create a second user identity from the first network element to a second network element of the second packet-based communication network;

the second network element creating the second user identity for use in the second packet-based communication network, the second user identity being derivable from the first user identity according to a predetermined rule; and storing the second user identity in the second packet-based communication network for use with subsequent communication events over the second packet-based communication network.

2. A method according to claim 1, wherein the predetermined rule comprises combining the first network identity and a predefined token.

3. A method according to claim 1, wherein the predetermined rule comprises concatenating the first network identity with at least one predefined control character.

4. A method according to claim 1, wherein the predetermined rule is a hash function.

5. A method according to claim 1, wherein the first packet-based communication network is an instant messaging network.

6. A method according to claim 1, wherein the second packet-based communication network is a voice over internet protocol network.

7. A method according to claim 6, wherein the voice over internet protocol network is a peer-to-peer network.

8. A method according to claim 6, wherein the communication event is a voice call.

9. A method according to claim 6, wherein the communication event is a video call.

10. A method according to claim 1, further comprising a calling user terminal initiating a communication event with the user over the second packet-based communication network.

11. A method according to claim 10, wherein the calling user terminal initiating the communication event with the user comprises the calling user terminal deriving the second user identity from the first user identity using the predetermined rule, and using the second network identity to establish a connection with the user over the second network.

12. A method according to claim 1, further comprising the user terminal initiating a communication event with a further user over the second packet-based communication network.

13. A method according to claim 12, further comprising the user terminal storing a list of contacts of the user, the list of contacts comprising network identities of the contacts in the first network.

14. A method according to claim 13, wherein initiating the communication event with the further user comprises selecting the further user from the list of contacts, deriving a network identity of the further user in the second network from the network identity in the first network stored in the list of contacts using the predetermined rule, and using the network identity of the further user in the second network to establish a connection with the further user over the second network.

15. A method according to claim 1, wherein the authorisation request received at the first network element further comprises a password.

16. A method according to claim 1, further comprising the user terminal deriving the second user identity from the first network using the predetermined rule and transmitting an authorisation request to the second communication network comprising the second user identity.

17. A method according to claim 16, further comprising the user terminal transmitting a request for a digital certificate to the first network element, the first network element requesting the digital certificate from the second network element, the second network element providing the digital certificate to the first network element, and the first network element providing the digital certificate to the user terminal.

18. A method according to claim 17, wherein a private key is derived from the digital certificate, and wherein the authorisation request transmitted to the second communication network comprises the private key.

19. A method according to claim 17, wherein the digital certificate is provided to the second packet-based communication network prior to initiating a communication event.

20. A system comprising a first network element connected to a first packet-based communication network and a second network element connected to a second packet-based communication network, wherein the first network element is arranged to receive an authorisation request comprising a first user identity from a user terminal and transmit a request to create a second user identity to the second network element responsive to the authorisation request, and the second network element is arranged to create the second user identity for use in the second packet-based communication network, the second user identity being derivable from the first user identity according to a predetermined rule, and store the second user identity for use with subsequent communication events over the second packet-based communication network.

21. A system according to claim 20, wherein the predetermined rule comprises combining the first network identity and a predefined token.

22. A system according to claim 20, wherein the predetermined rule comprises concatenating the first network identity with at least one predefined control character.

23. A system according to claim 20, wherein the predetermined rule is a hash function.

24. A system according to claim 20, wherein the first packet-based communication network is an instant messaging network.

25. A system according to claim 20, wherein the second packet-based communication network is a voice over internet protocol network.

26. A system according to claim 25, wherein the voice over internet protocol network is a peer-to-peer network.

27. A system according to claim 25, wherein the communication event is a voice call.

28. A system according to claim 25, wherein the communication event is a video call.

29. A system according to claim 20, further comprising a calling user terminal arranged to initiate a communication event with the user over the second packet-based communication network.

30. A system according to claim 29, wherein the calling user terminal comprises means for deriving the second user identity from the first user identity using the predetermined rule, and means for using the second network identity to establish a connection with the user over the second network.

31. A system according to claim 20, wherein the user terminal comprises means for initiating a communication event with a further user over the second packet-based communication network.

32. A system according to claim 31, wherein the user terminal further comprises means for storing a list of contacts of the user, the list of contacts comprising network identities of the contacts in the first network.

33. A system according to claim 32, wherein the means for initiating the communication event with the further user comprises means for selecting the further user from the list of contacts, means for deriving a network identity of the further user in the second network from the network identity in the first network stored in the list of contacts using the predetermined rule, and means for using the network identity of the further user in the second network to establish a connection with the further user over the second network.

34. A system according to claim 20, wherein the authorisation request received at the first network element further comprises a password.

35. A system according to claim 20, wherein the user terminal comprises means for deriving the second user identity from the first network using the predetermined rule and transmitting an authorisation request to the second communication network comprising the second user identity.

36. A network element connected to a packet-based communication network, comprising:
- means for receiving a request to create a user identity from a further network entity connected to a further packet-based communication network, the request comprising a further user identity used in the further packet-based communication network;
- means for creating the user identity for use in the packet-based communication network, the user identity being derivable from the further user identity according to a predetermined rule; and
- means for storing the user identity in the packet-based communication network for use with subsequent communication events over the packet-based communication network.

37. A method of authorising a user of a first packet-based communication network to access a second packet-based communication network, comprising:
- receiving at a network entity connected to the second packet-based communication network a request to create a user identity, the request being transmitted from a first network entity connected to the first packet-based communication network and comprising a first user identity used in the first packet-based communication network;
- the network entity creating the user identity for use in the second packet-based communication network, the user identity being derivable from the first user identity according to a predetermined rule; and
- the network entity storing the user identity in the second packet-based communication network for use with subsequent communication events over the second packet-based communication network.

38. A computer program product embodied on a non-transient computer-readable medium and configured so as when executed on a processor performs the steps of:
- receiving at a network entity connected to a second packet-based communication network a request to create a user identity, the request being transmitted from a first network entity connected to a first packet-based communication network and comprising a first user identity used in the first packet-based communication network;
- the network entity creating the user identity for use in the second packet-based communication network, the user identity being derivable from the first user identity according to a predetermined rule; and
- the network entity storing the user identity in the second packet-based communication network for use with subsequent communication events over the second packet-based communication network.

* * * * *